(12) United States Patent
Liu et al.

(10) Patent No.: US 8,774,022 B2
(45) Date of Patent: Jul. 8, 2014

(54) WIRELESS COMMUNICATION SYSTEM, BASE STATION, RESOURCE BLOCK ALLOCATION METHOD, AND PROGRAM

(75) Inventors: Le Liu, Tokyo (JP); Kenji Koyanagi, Tokyo (JP); Takamichi Inoue, Tokyo (JP); Yoshikazu Kakura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/735,992

(22) PCT Filed: Mar. 16, 2009

(86) PCT No.: PCT/JP2009/055031
§ 371 (c)(1),
(2), (4) Date: Aug. 31, 2010

(87) PCT Pub. No.: WO2009/116489
PCT Pub. Date: Sep. 24, 2009

(65) Prior Publication Data
US 2010/0329199 A1 Dec. 30, 2010

(30) Foreign Application Priority Data

Mar. 19, 2008 (JP) .................................. 2008-072616

(51) Int. Cl.
| | | |
|---|---|---|
| G08C 15/00 | (2006.01) | |
| H04W 4/00 | (2009.01) | |
| H04L 12/56 | (2006.01) | |

(52) U.S. Cl.
USPC .................. 370/252; 370/330; 370/395.4

(58) Field of Classification Search
None
See application file for complete search history.

(56) References Cited

U.S. PATENT DOCUMENTS

| 8,571,001 B2 | 10/2013 | Ogawa et al. | |
|---|---|---|---|
| 2006/0293076 A1* | 12/2006 | Julian et al. ................... | 455/522 |
| 2007/0109956 A1* | 5/2007 | Kwon et al. .................. | 370/208 |
| 2008/0186880 A1* | 8/2008 | Seki et al. ..................... | 370/281 |
| 2009/0034465 A1* | 2/2009 | Papasakellariou et al. ... | 370/329 |

(Continued)

FOREIGN PATENT DOCUMENTS

| JP | 2006-050545 | 2/2006 |
|---|---|---|
| JP | 2006-050545 A | 2/2006 |

(Continued)

OTHER PUBLICATIONS

U.S. Appl. No. 60/953,056, Papasakellariou et al., Control Channel Dimensioning for Scheduling Packet Transmissions in SC-FDMA Communication Systems, Jul. 31, 2007, p. 2.*

(Continued)

*Primary Examiner* — Chirag Shah
*Assistant Examiner* — Ashley Shivers
(74) *Attorney, Agent, or Firm* — McGinn IP Law Group, PLLC (57) ABSTRACT

A scheduling technique for limiting a discontinuous spectrum to reduce control information to be transmitted from a base station (BS) to each of mobile stations. The method has a ranking means for ranking the mobile stations for each resource block depending on the channel status, and an allocation means for allocating the resource blocks to the mobile stations depending on the ranking of the mobile stations so that the number of resource blocks in a resource block group for one mobile station may be not more than a set number. The resource block group including at least one or more continuous resource blocks on the frequency axis.

9 Claims, 9 Drawing Sheets

(56) References Cited

U.S. PATENT DOCUMENTS

| | | | |
|---|---|---|---|
| 2009/0040936 A1* | 2/2009 | Wu et al. | 370/252 |
| 2009/0147736 A1* | 6/2009 | Chen et al. | 370/329 |
| 2009/0170522 A1* | 7/2009 | Tirkkonen et al. | 455/452.1 |

FOREIGN PATENT DOCUMENTS

| | | |
|---|---|---|
| JP | 2007-274042 | 10/2007 |
| WO | WO 2005/089006 A1 | 9/2005 |
| WO | WO 2007/119591 A1 | 10/2007 |

OTHER PUBLICATIONS

U.S. Appl. No. 60/877,752, Tirkkonen et al., filed Dec. 28, 2006, Nokia, p. 12, lines 15-17.*

Rhee, et al., "Increase in Capacity of Multiuser OFDM System Using Dynamic Subchannel Allocation", Star Laboratory, Proc. IEEE VTC'00, May 2000, pp. 1085-1089.

NEC Group, R1-071507, "DL unicast resource allocation signaling," 3GPP TSG-RAN WG1 Meeting #48bis, St. Julian's Malta, Mar. 2007, pp. 1-4.

3GPP TR 25.814 (V731.0), "Physical Layer aspects for evolved Universal Terrestrial Radio Access (UTRA)." http://www.3gpp.org/ftp/Specs/archive/25_series/25.814/ , 2006, pp. 1, 20, and 71.

Samsung, DL resource allocation strategy, R1-063276, 3GPP, RAN WG1#47, Nov. 6-10, 2006.

Samsung, DL resource allocation strategy, R1-062530, 3GPP, RAN WG1 46bis, Oct. 9-13, 2006.

Samsung, DL resource allocation strategy, R1-061693, 3GPP, RAN WG1 LTE Adhoc, Jun. 27-30, 2006.

NTT DoCoMo, Fujitsu, NEC, SHARP, Channel-Dependent Scheduling Method for Single-Carrier FDMA Radio Access in Evolved UTRA Uplink, R1-050701, 3GPP TSG RAN WG1 #42 on LTE, Aug. 29-Sep. 2, 2005.

Japanese Office Action dated Jan. 9, 2013 with partial English translation thereof.

NTT DoCoMo, Fujitsu, NEC, SHAPE, Chanel-Dependent Scheduling Method for Single-Carrier FDMA Radio Access in Evolved UTRA Uplink, R1-050701, 3GPP, Sep. 2, 2005.

Japanese Office Action dated Apr. 2, 2014 with an English Translation.

* cited by examiner

|   | UE | RB |
|---|----|----|
| 1 | A  | 4  |
| 2 | C  | 5  |
| 3 | B  | 3  |
| 4 | B  | 6  |
| 5 | A  | 7  |
| 6 | B  | 8  |
| 7 | C  | 1  |
| 8 | A  | 2  |
| 9 | A  | 2  |
| 10| C  | 8  |
| ⋮ | ⋮  | ⋮  |

701

WIRELESS COMMUNICATION SYSTEM, BASE STATION, RESOURCE BLOCK ALLOCATION METHOD, AND PROGRAM

TECHNICAL FIELD

The present invention relates to a wireless (or radio) communication technology and particularly to a technology for allocating resource blocks in wireless communications.

BACKGROUND OF THE RELATED ART

In wireless communication systems, a base station (BS) communicates with plural mobile stations (User Equipment: UE) via various multiple access schemes. The multiple access scheme is classified, according to resources to be divided, into the code multiplexing access (CDMA) that executes accessing via code division, the frequency divisional multiplexing access (FDMA) that executes accessing via frequency division, and the time divisional multiplexing access (TDMA) that executes accessing via time division.

The FDMA scheme has gotten a lot of attention because it is effective in high-speed data transmission via wireless channels. As to the FDMA scheme, there is a single-carrier FDMA (SD-FDMA) scheme, which is up-link multiple access adopted in long term evolution (LTE) of $3^{rd}$ generation partnership project (3GPP), in addition to the orthogonal frequency division multiplexing, which transmits data with plural orthogonal sub-carriers (see non-patent document 1).

The system, which performs communications according to the FDMA scheme, uses orthogonal frequencies to transmit data to different users so that interference between users is suppressed. Mobile stations become various communication states under a wide variety of environments. Flexibly allocating wireless communication resources is important to obtain the multiple diversity effect. For that reason, flexibly allocating wireless communication resource by a base station is effective to obtain a high throughput in the FDMA scheme (see non-patent document 2).

The sub-carrier groups arranged serially on the frequency axis one slot form one resource block (RB). When the bandwidth of a resource block is smaller than the coherent bandwidth of a channel, it can be assumed that the channel frequency response of one resource block is constant.

By allocating resource blocks in good channel state to mobile stations, the base station can obtain a large multiple diversity effect (see non-patent document 3). As a result, high throughput can be realized. Hereinafter, the method will be described below.

For scheduling depending on a propagation path, each mobile station transmits a reference signals and the base station measures the channel quality indicator (CQI) using the transmitted reference signal and then inputs the CQI to the scheduler unit.

Plural resource block groups, formed of resource blocks in serial on the frequency axis at one transmission time interval (TTI), are allocated to mobile stations UE based on the CQI order of a mobile station in each input resource block. Hereinafter, the resource block group is called as frequency block. The non-patent document 2 describes that scheduling depending on the propagation path in the frequency domain increases the multiple diversity effect. However, the non-patent document 2 does not disclose how to allocate a limited number of plural frequency blocks to mobile stations UE.

Non-patent document 1: 3GPP TR 25.814(V7.1.0), "Physical layer aspects for evolved Universal Terrestrial Radio Access (UTRA)", "http://www.3gpp.org/ftp/Specs/archive/25_series/25.814/.

Non-patent document 2: W. Rhee and J. M. Cioffi, "Increase in capacity of multi user OFDM system using dynamic subchannel allocation," Proc. IEEE VTC'00, Tokyo, Japan, May 2000, pp. 1085-1089.

Non-patent document 3: NEC Group, R1-071507, "DL unicast resource allocation signaling", 3GPP TSG-RAN WG1 Meeting #48bis, St. Julian's, Malta, 26-30 Mar. 2007.

DISCLOSURE OF THE INVENTION

Problems to be Solved by the Invention

As described above, when frequency blocks are allocated based on the CQI order of a mobile station, a large number of frequency blocks are allocated to one mobile station. As a result, since resource block allocation patterns increases, the overhead due to scheduling information, sent from a base station to mobile stations, becomes large.

Moreover, since PAPR increases with an increasing number of frequency blocks, the problem is that PAPR of a mobile station at the end of a cell will increase if the number of frequency blocks is not restricted.

The problem to be solved by the present invention is to provide a resource block allocation method designed in consideration of a trade-off between the multiuser diversity effect and the overhead due to scheduling information.

Means to Solve the Problems

In order to overcome the above mentioned problems, according to the present invention, a wireless communication system comprises a ranking means for ranking a mobile station for each resource block, based on a channel condition; and an allocation means for allocating a resource block to the mobile station based on the ranking of the mobile station in such a way that the number of resource block groups, in which at least one or more resource blocks are serially arranged on a frequency axis, per mobile station is set to less than a set value.

In order to overcome the above mentioned problems, according to the present invention, a base station comprises a ranking means for ranking mobile stations for each resource block, based on a channel state; and an allocation means for allocating a resource block to a mobile station based on the mobile station ranking in a such a way that the number of resource block groups, consisting of at least one or more resource blocks continuously formed on a frequency axis, to a single mobile station is set to less than a set value.

In order to overcome the above mentioned problems, a resource block allocation method comprises the step of allocating a resource block to a mobile station based on information ranking mobile stations for each resource block according to a channel state in such a way that the number of resource block groups, consisting of at least one or more resource blocks continuously formed on a frequency axis, to a single mobile station is set to less than a set value.

In order to overcome the above mentioned problems, a program, applied in a base station, directs the base station to allocate a resource block to a mobile station based on information ranking mobile stations for each resource block according to channel states, in such a way that the number of resource block groups, consisting of at least one or more resource blocks formed continuously on a frequency axis, to a single mobile station is set to less than a set value.

The Effect of the Present Invention

According to the present invention, the base station BS does not allocate the frequency block excessively to mobile stations UEs. That is, the base station can allocate a suitable number of frequency blocks to mobile stations UEs, thus preventing an increase in overhead due to scheduling information.

EXPLANATION OF SYMBOLS

100 Wireless communication system
101 Base station (BS)
102, 103, 104 Mobile station (UE)

BEST MODE FOR CARRYING OUT THE INVENTION

The features and contents of the present invention will be explained below by referring to embodiments shown in attached drawings (FIG. 1 to FIG. 8). These contents and drawings show typical embodiments of the present invention. Persons skilled in the art can embody the present invention even in any types of wireless networks and hence should not consider that the typical embodiments restricts the scope of the present invention.

The present invention relates to the technique of scheduling in wireless communications employing the frequency divisional multiplexing access (FDMA) scheme.

Figure 1:
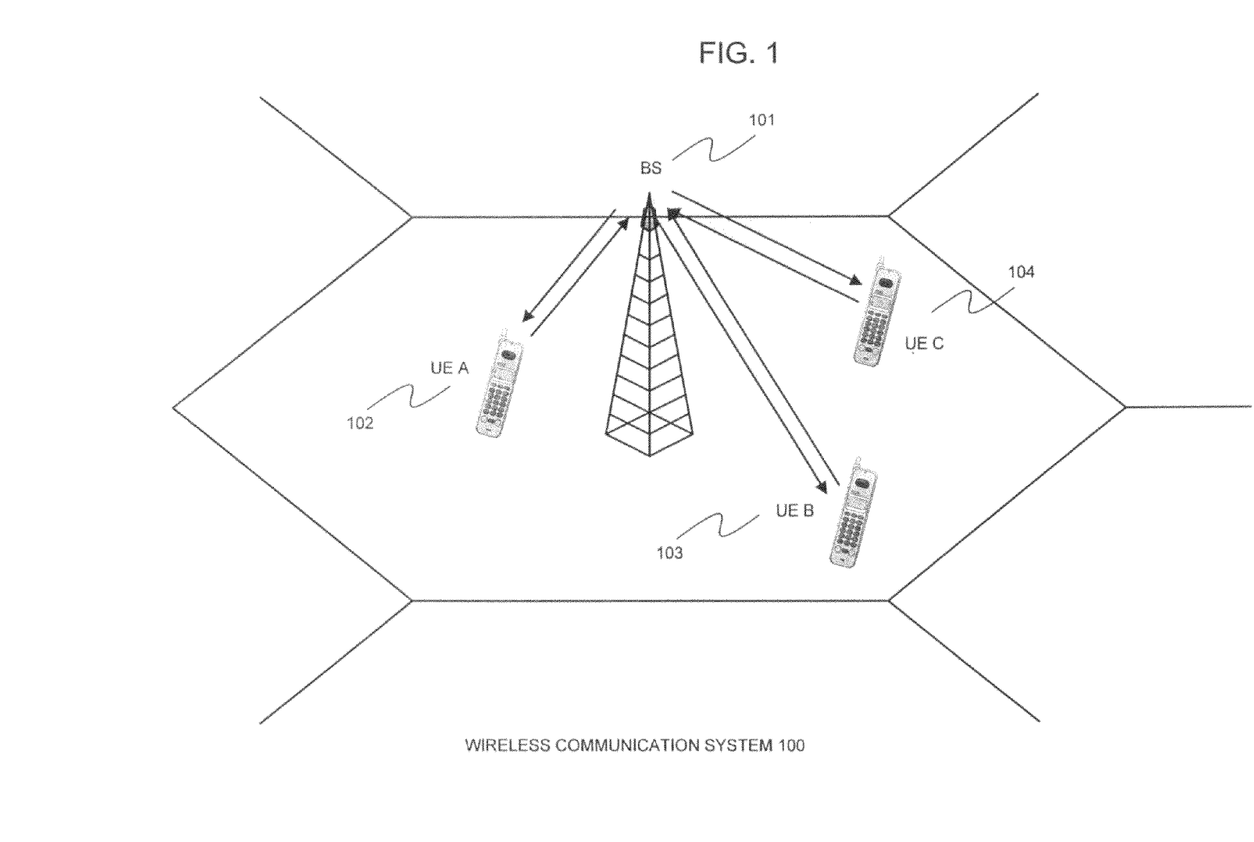
FIG. 1 is a diagram explaining a mobile station system.

FIG. 1 is a diagram illustrating a wireless communication system 100 according to the present invention. A base station (BS) 101 accommodates plural mobile stations (UF-A 102, UE-B 103, UE-C 104, . . . ). For example, communications between the base station and mobile stations are established using SC-FDMA (Single Carrier-Frequency Division Multiplexing) scheme or OFDM (Orthogonal Frequency Division Multiplexing) scheme.

For data communications between the base station and mobile stations, the base station BS 101 allocates resource blocks for up-links (from UE to BS) and down-links (from BS to UE) of UE-A 102, UE-B 103, and UB-C 104. The long term evolution (LTE) of $3^{rd}$ generation partnership project (3GPP) uses the frequency scheduling depending on propagation path. One or plural frequency blocks, each which is configured of continuous resource blocks (formed of plural sub-carriers) on the frequency axis within one transmit time interval (TTI), per mobile station are allocated. At this time, the base station sets preliminarily the number of frequency blocks to be allocated to the same user within the same TTI and further allocates resource blocks such that the number of resource blocks does not exceed the number of frequency blocks.

Figure 3:
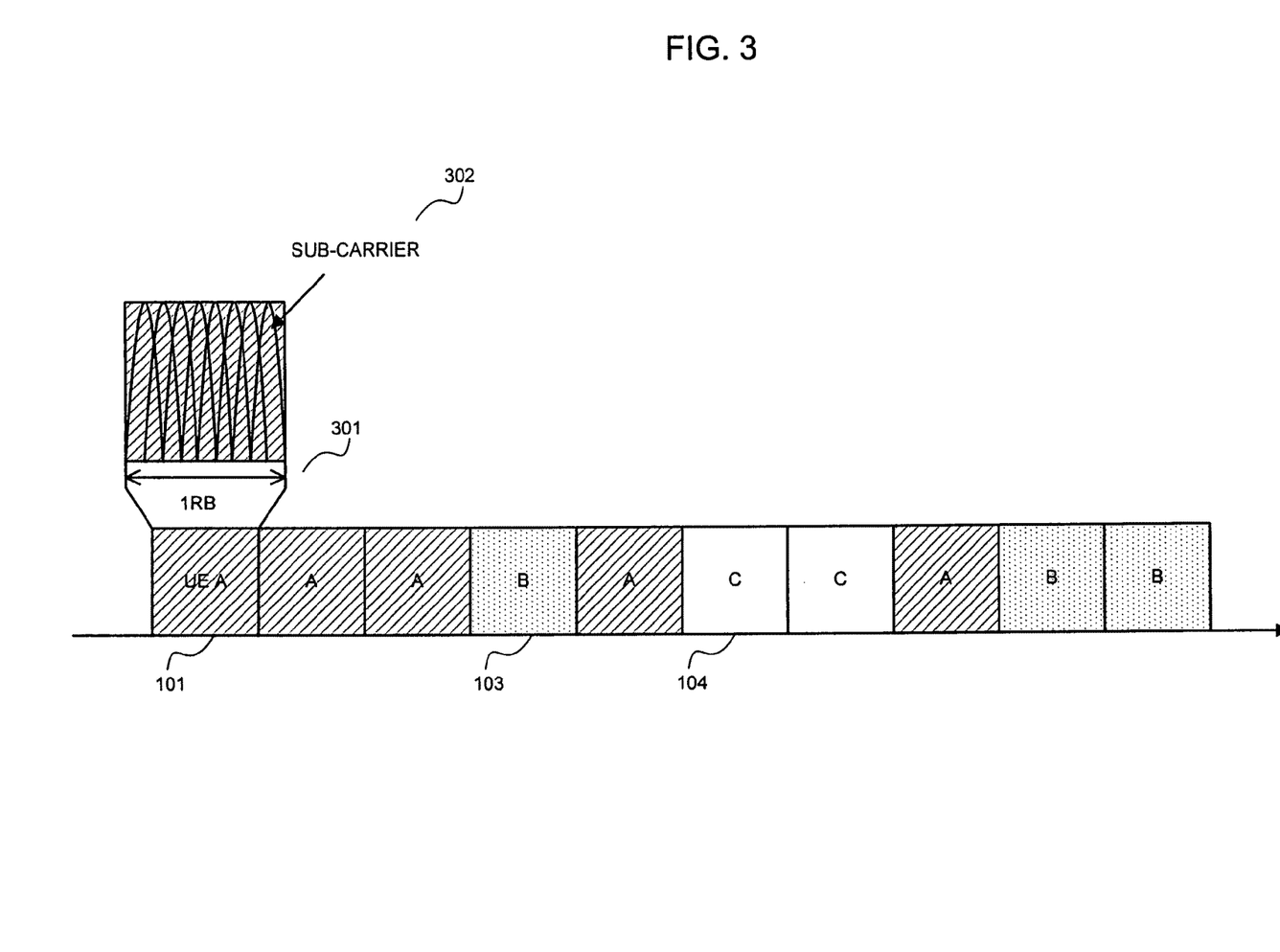
FIG. 3 is a diagram explaining allocation of a resource block.

The aspect that plural frequency blocks are allocated to the same terminal in the system band of a base station will be explained here by referring to FIG. 3. In the example shown in FIG. 3, a total of 80 sub-carriers within the system band are divided into 10 resource blocks, each including 8 continuous sub-carriers, and three mobile stations undergo scheduling in ITTI. Three frequency blocks are allocated to UE A (101); two frequency blocks are allocated to UE B (103); and one frequency block is allocated to UE C (104).

Figure 2:
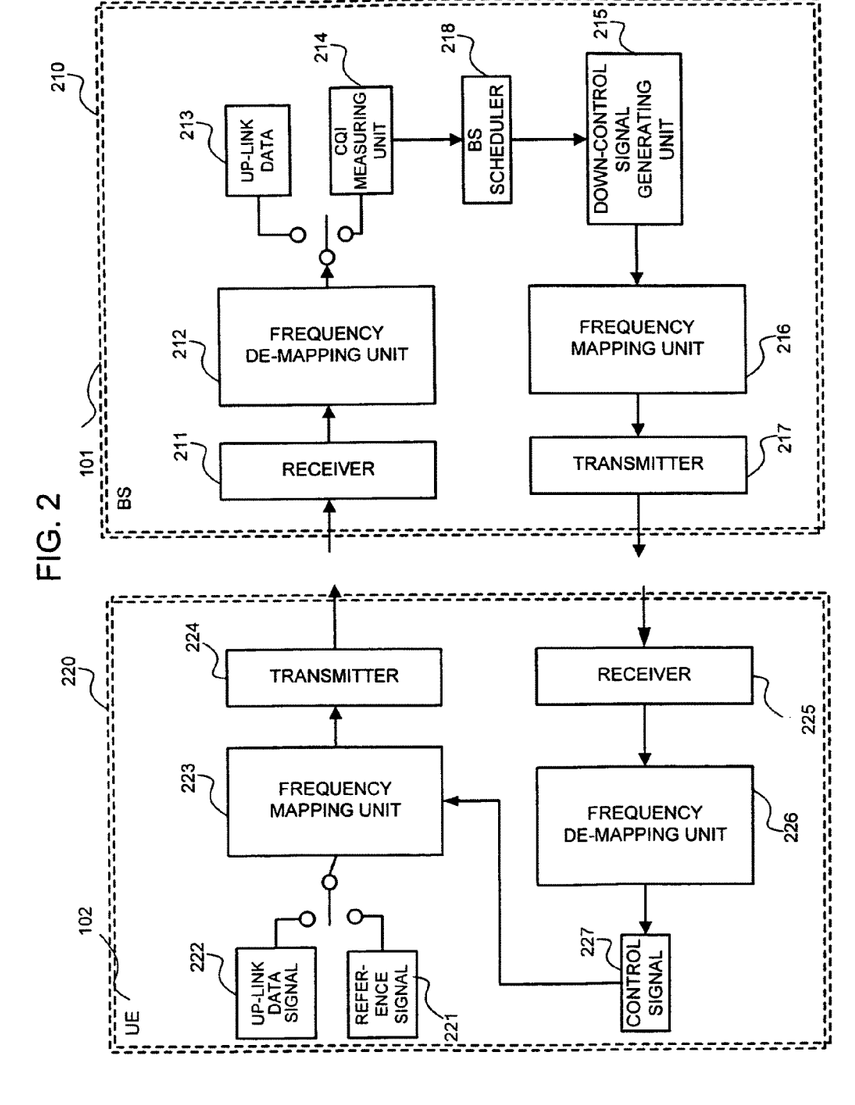
FIG. 2 is a diagram illustrating a mobile station and a base station according to the present invention.

FIG. 2 is a block diagram illustrating the configuration of a base station BS and the configuration of a mobile station UE.

The frequency de-mapping unit 212 outputs a reference signal from a mobile station, for example, received by a receiver 211, for each user. Similarly, when data signals are transmitted, the receiver 211 receives the data signals and the frequency de-mapping unit 212 separates up-link (UPLINK) data 213 for each user according to the result from the BS scheduler 218.

The CQI (Channel Quality Indicator) measuring unit 214 measures CQI (Channel Quality Indicator) of all resource blocks (frequency bands corresponding to respective resource blocks) in the up-link from the separated reference signals.

The BS scheduler 218 performs scheduling for allocating resource blocks to mobile stations. For example, the BS scheduler 218 executes ranking in turn from mobile stations in a good channel state for each resource block, based on an up-link CQI indicating the channel state of each mobile station. Next, a resource block in a best channel state is selected and then allocated to a mobile station in a best channel state in the corresponding resource block. It is determined whether or not the number of frequency blocks currently allocated to the mobile station, to which the resource block has been allocated, exceeds the number of maximum frequency blocks. When the number of frequency blocks exceeds the number of maximum frequency blocks, the BS scheduler 218 performs the updating process (described later). If not so, the UE setting step terminates (described later). The number of maximum frequency blocks may be set preliminarily to the scheduler at the time of factory shipment or may be set or updated suitably at or after installation.

The down-control signal generating unit 215 generates down-control signals based on the allocation results in the scheduler 218. The frequency mapping unit 216 performs mapping process and transmits the outcome via the transmitter 217.

In succession, the configuration of the mobile station UE will be explained below.

The mobile station sets a resource block for transmission according to the down-control signal received from the base station.

In the mobile station, the reference signal 221 is generated according to the notification from the base station to notify CQI for up-link. The frequency mapping unit 223 maps the generated reference signal over the frequency band determined for each user and transmits the outcome to the base station via the transmitter 224. Similarly, when the up-link (UPLINK) data signal 222 is transmitted to the base station, the frequency mapping unit 223 maps the resource block according to the down-control signal received from the base station and transmits the outcome to the base station via the transmitter 224.

Moreover, the receiver 225 receives the down-control signal and the down-data signal, transmitted from the base station, and the frequency de-mapping unit 226 extracts the down-control signal.

Here, data transmission via the up-link has been explained. However, the operation can be applied similarly in the down-link. In the down-link, scheduling is performed based on down-CQI notified by the up-link control signal.

Subsequently, the operation of the present embodiment will be explained here. To enable the channel dependent scheduling by the BS scheduler 218, it is assumed that each UE has already notified propagation path quality (or referred to as channel quality indicator (CQI)) to the BS scheduler 218.

Figure 4:
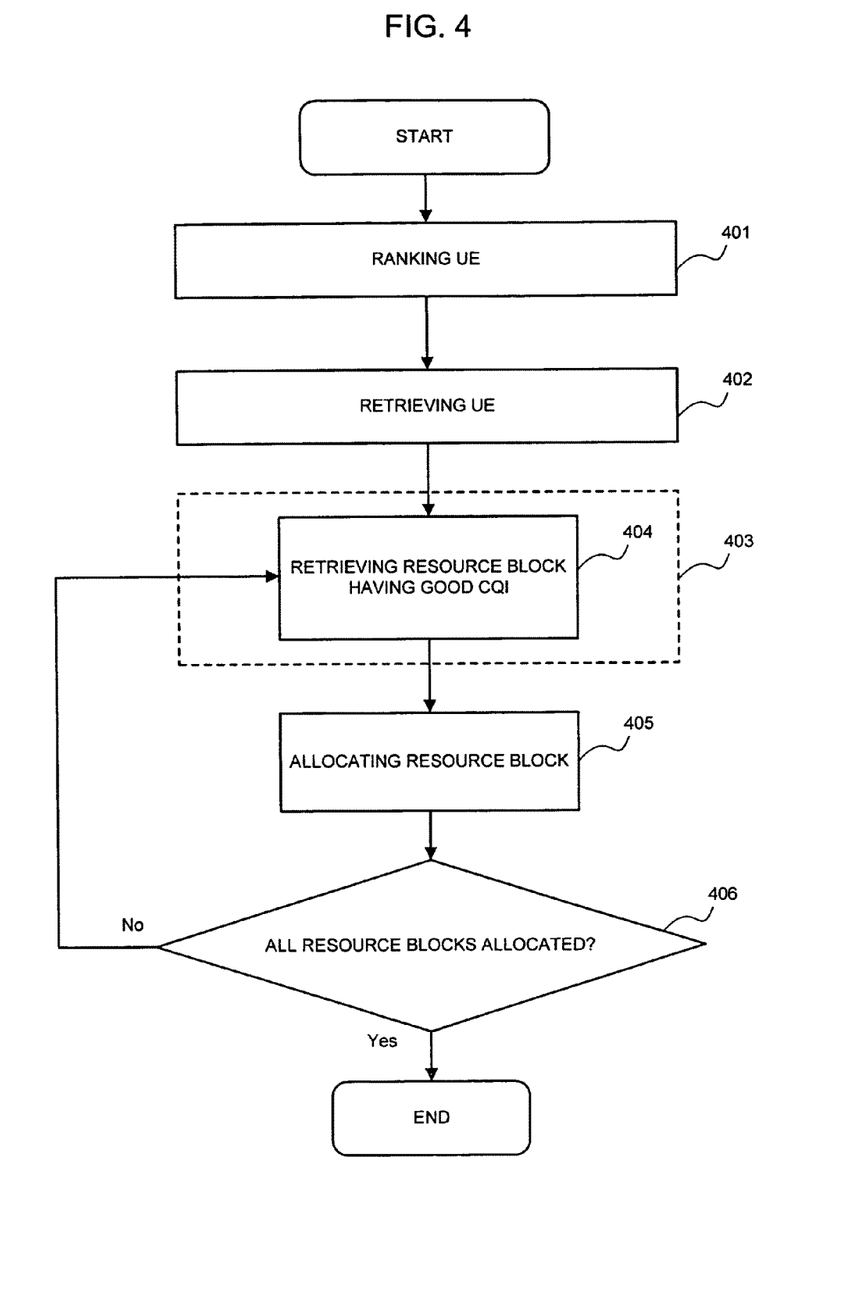
FIG. 4 is a flow chart in the case where a maximum number of frequency blocks, to be allocated to a mobile station, is not set.

The scheduling scheme of the BS scheduler, in the case when a maximum number of frequency blocks allocated to a mobile station is not set, will be explained below by referring to FIG. 4. In such a case, the BS scheduler allocates a resource block to a mobile station, which has a best CQI.

The BS scheduler 218 ranks mobile stations according to the channel states of all mobile stations for each resource block (step 401).

The BS scheduler retrieves mobile stations UE in good (preferably, best) channel state from respective resource blocks (step 402).

A mobile station in best channel state is selected for each resource block (step 403).

The BS scheduler allocates a resource block to the mobile station selected in the step 403 (step 405).

Whether or not all resource blocks have been allocated to the mobile station is confirmed after the resource block allocation. If all resource blocks have allocated, the process terminates. If not so, the process returns to the step 403 and the remaining resource blocks, not yet allocated, are allocated to the mobile station (step 406).

When a maximum number of frequency blocks to be allocated to the mobile station is not set, as mentioned above, the BS scheduler allocates a frequency block to the mobile station UE, according to the channel state of a mobile station in each resource block reported.

Figure 5:
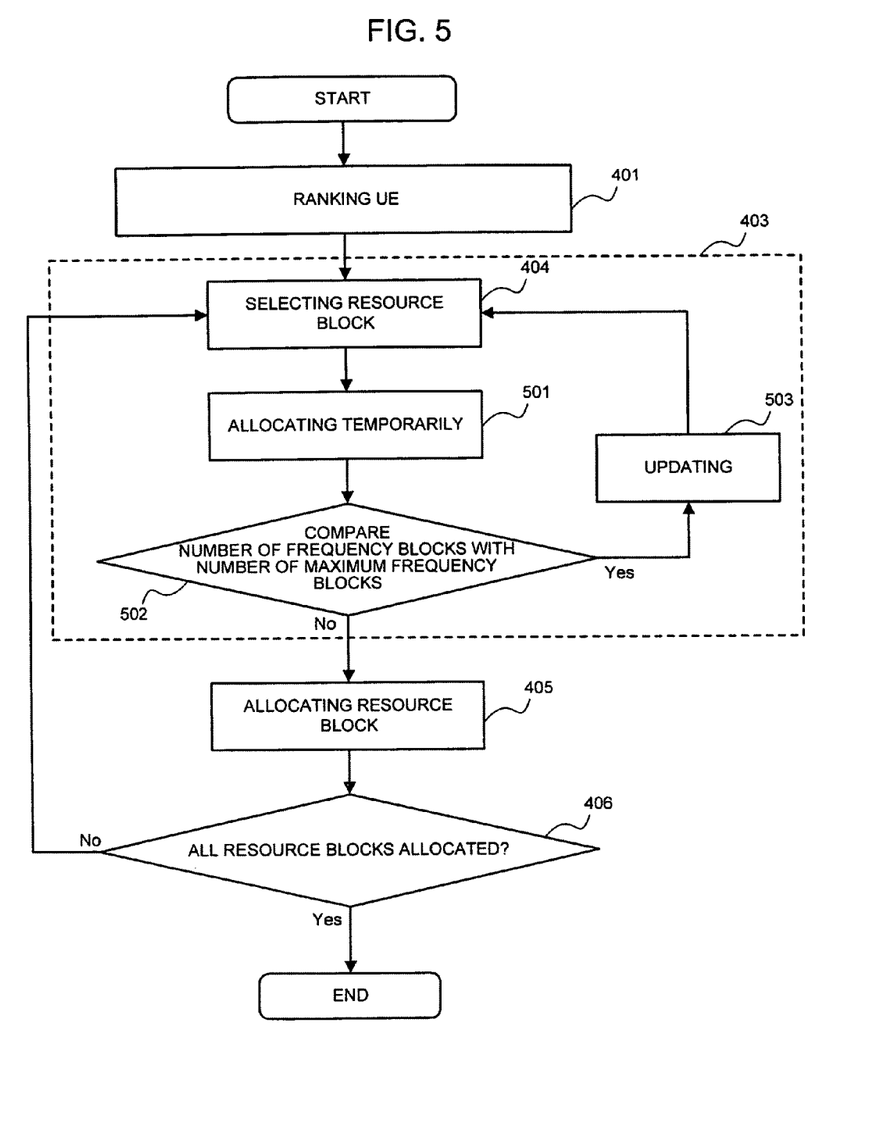
FIG. 5 is a flow chart explaining the operation of a first embodiment.

Next, the scheduling method, in the present embodiment, for each resource block when a maximum number of frequency blocks allocated to a mobile station is set will be explained by referring to FIG. 5.

The BS scheduler ranks resource blocks in the order of better channel state for each resource block, based on the channel states of mobile stations (step 401).

Next, the BS scheduler selects a resource block in good (preferably, best) channel state (step 404). At this time, the resource block in the best CQI are selected among CQIs of all resource blocks notified from all mobile stations. An average value of CQIs notified by a mobile station may be calculated for each resource block so that a resource block having a higher average value is selected.

The scheduler allocates a selected resource block to a mobile station in good (preferably, best) channel state within the selected resource block (step 501).

Whether or not the number of frequency blocks allocated to a mobile station exceeds the maximum number of frequency blocks is confirmed (step 502). If the number of frequency blocks allocated to the mobile station exceeds the maximum number of frequency blocks (Yes), the scheduler performs an updating process (step 503). If no, the UE setting step terminates and the process of allocating a resource block is performed (step 405). Whether or not all resource blocks have been allocated is confirmed (step 406). If no, the process returns to the step 404. If yes, the process terminates.

The updating process (step 503) will be explained here.

When the number of frequency blocks currently allocated to a mobile station, to which a resource block is to be allocated, exceeds the maximum number of frequency blocks, any one of the following processes (1), (2), (3), and (4) is performed. That is, (1) A mobile station in good channel state (preferably, best) is set as an allocation candidate in adjacent resource blocks neighboring to a resource block to be allocated.

(2) Since a resource block cannot be allocated to the mobile station, the process is performed of excluding the corresponding mobile station from among ranked mobile stations. In the resource block to be allocated, a mobile station in the second best channel state (lower order mobile station) to the corresponding mobile station is set as an allocation candidate.

(3) It is confirmed whether or not the resource blocks on both adjacent sides have been already allocated to a mobile station. If the resource blocks on the both adjacent sides have not been allocated, the mobile station in the second best state to the mobile station to be allocated in the resource block is set as an allocation candidate. When either of adjacent resource blocks is in an allocated state, the resource block is allocated to the mobile station allocated to the other adjacent resource block. If both the adjacent resource blocks are in an allocated state, the mobile station allocated to an adjacent resource block in a best channel state is set as an allocation candidate.

(4) The scheduler confirms whether or not an adjacent resource block having CQI lower than the CQI of a resource block to be allocated exists. If yes (one having lower CQI when both adjacent resource blocks have low CQIs), the mobile station, set as being in currently best channel state in the corresponding adjacent resource block, and a mobile station to be allocated exchange resource blocks for allocation. By doing so, whether or not the resource block group can be generated is confirmed in such a way that the number of frequency blocks of the mobile station does not exceed the maximum number of frequency blocks. If the resource block group can be generated, the resource blocks are replaced. If not so, whether or not a resource block group can be generated is confirmed when the mobile station to be allocated is replaced with a mobile station in the second best channel state to the mobile station. On the other hand, when an adjacent resource block having CQI lower than the CQI of the resource block to be allocated does not exist, a mobile station in the second better channel state to the mobile station is set as an allocation candidate in resource blocks to be allocated.

Information about resource blocks allocated by the BS scheduler 218 is notified to mobile stations.

The frequency de-mapping unit 226 extracts information about the resource blocks notified and the frequency mapping unit 223 transmits up-link data according to the information.

In the present embodiment, resource blocks are allocated to mobile stations in turn from best resource blocks. However, resource blocks may be allocated in turn from among ranked resource blocks based on predetermined requirements, for example, in turn from among ranked resource blocks belonging to low frequencies or high frequencies.

As described above, the BS scheduler of the present invention allocates resource blocks in such a way that the number of frequency blocks allocated to each mobile station does not exceed the maximum number of frequency blocks. Therefore, an increase in PAPR with an increase in the number of frequency blocks can be prevented.

(Second Embodiment)

Figure 6:
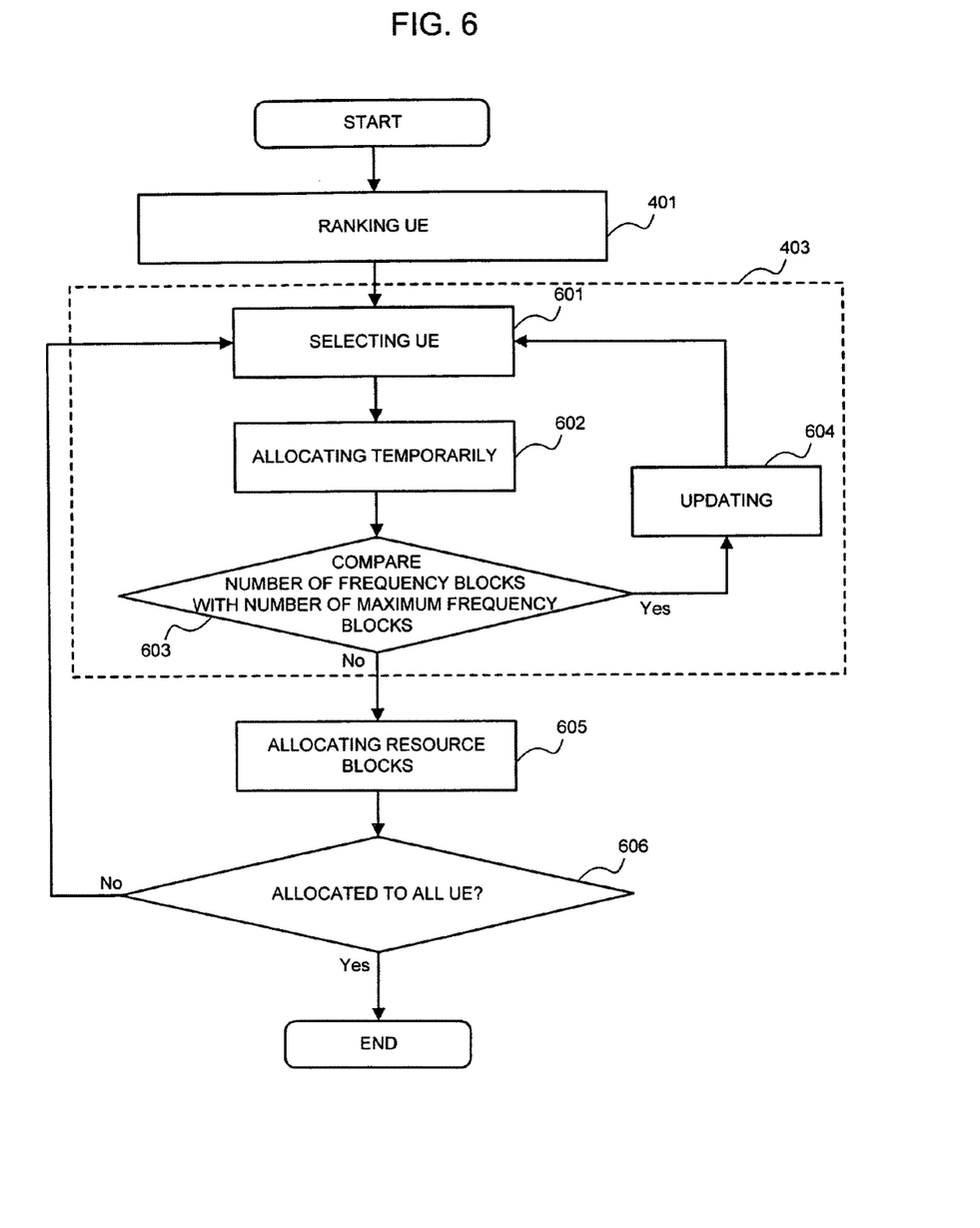
FIG. 6 is a flow chart explaining the operation of a second embodiment.

The scheduling method different from that in the above embodiment will be explained below by referring to FIG. 6. In the present embodiment, the case will be explained where selection is made in turn from mobile stations UE having the best CQI and resource blocks are allocated in turn from the selected mobile stations UE.

The scheduler ranks mobile stations in order of better channel states, based on channel states for each resource block (step 401).

Mobile stations in a good channel state (preferably, in best) are selected (step 601). Among mobile stations ranked for each resource block in the step 401, all resource blocks, in which the mobile station is in a good (preferably, best) channel state, are handled as candidates allocated to mobile stations (step 602).

A candidate resource block, which configures plural frequency blocks, decides whether or not the number of frequency blocks (candidates) exceeds the maximum number of frequency blocks (step 603). When the number of frequency blocks exceeds the maximum number of frequency blocks (Yes), the scheduler performs the updating process 604. If not (No), the UE setting step terminates and the resource block allocation process is performed (step 605). The scheduler confirms whether or not all mobile stations UE have been allocated (step 606). If no, the process returns to the step 601. If yes, the process terminates.

The updating process (step 604) will be explained here.

When the number of frequency blocks is more than a maximum number of frequency blocks, the frequency blocks allocated as candidates currently to the mobile station are ranked in the order of better averaged channel state of frequency blocks. Frequency blocks in a good averaged channel state are selected to the maximum number of frequency blocks among the frequency blocks, which are candidates, and are allocated to the mobile station. Thereafter, the resource blocks belonging to frequency blocks, which have not been allocated, undergo any one of the following processes.

(1) In the resource blocks adjacent to resource blocks not selected, mobile stations in good (preferably, best) channel state are set as allocation candidates.

(2) In resource blocks not selected, mobile stations in the second best state to the mobile station are set as allocation candidates.

(3) It is confirmed whether or not resource blocks adjacent to the resource blocks not selected have been already allocated to a mobile station. When resource blocks on both sides have not been yet allocated, mobile stations in the second best channel condition to the mobile station in currently good (preferably, best) channel condition in the resource blocks are selected as allocation candidates. When either of adjacent resource blocks has been allocated, the mobile station allocated to the adjacent resource block is set as an allocation candidate for the resource block. When all adjacent resource blocks have been already allocated, the mobile station in good (preferably, best) channel condition in the adjacent resource blocks is set as an allocation candidate.

(4) The scheduler confirms whether or not an adjacent resource block having CQI lower than the CQI of a resource block not selected exist. If yes, by exchanging the mobile station set in currently good (preferably best) channel condition, in the resource blocks, with a mobile station to be allocated, whether or not a resource block group can be generated is confirmed. If possible, the concerned mobile stations are exchanged. If not possible, it is confirmed whether or not a resource block group can be generated when the mobile station is exchanged with a mobile station in the second best channel condition to the mobile station in the resource block to be allocated. If an adjacent resource block having CQI lower than CQI of the resource block not selected does not exist, a mobile station in the second best channel condition to the mobile station in the resource block not selected is set as an allocation candidate.

In the first and second embodiments, explanation has been made as to the case where a base station performs ranking based on up-link CQI. However, the base station may perform ranking based on down-link CQI. In such a case, a mobile station measures the down-link CQI using the down reference signal and transmits the up-control signal describing the measured down-CQI to a base station.

Resource blocks are allocated in turn from mobile stations having best CQIs. However, allocation may be made from ranked mobile stations based on predetermined requirements. For example, ranking is made according to mobile station classes defined by the number of antennas of mobile stations or the like.

As described above, since the BS scheduler of the present invention allocates the resource block in such a way that the number of frequency blocks allocated to each mobile station does not exceed the maximum number of frequency blocks, an increase in overhead due to scheduling information can be prevented. Moreover, when SC-FDMA is applied, an increase in PAPR due to an increased number of frequency blocks can be prevented.

In the first and second embodiments, explanation has been made as to the case where a base station performs ranking based on up-link CQI. However, the base station may perform ranking based on down-link CQI. In such a case, a mobile station measures down-CQIs using the down-reference signal and transmits the up-control signal describing the measured down-CQI to a base station.

Resource blocks are allocated in turn from mobile stations having the best CQI. However, allocation may be made from ranked mobile stations based on predetermined requirements. For example, ranking may be made according to mobile station classes defined by the number of mobile station antennas.

EXAMPLES

The updating process in the first embodiment will be explained by referring to FIG. 7. In the present example, explanation will be made as to the case where eight resource blocks are allocated to three mobile stations UE (UE A, UE B, and UE C) and the maximum number of frequency blocks is set to 2.

Figure 9:
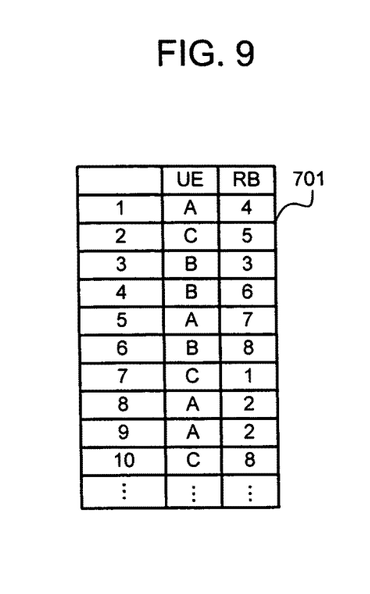
FIG. 9 is a table showing an example of ranking.

FIG. 9 is a table ranking CQI of each mobile station for each resource block.

Figure 7:
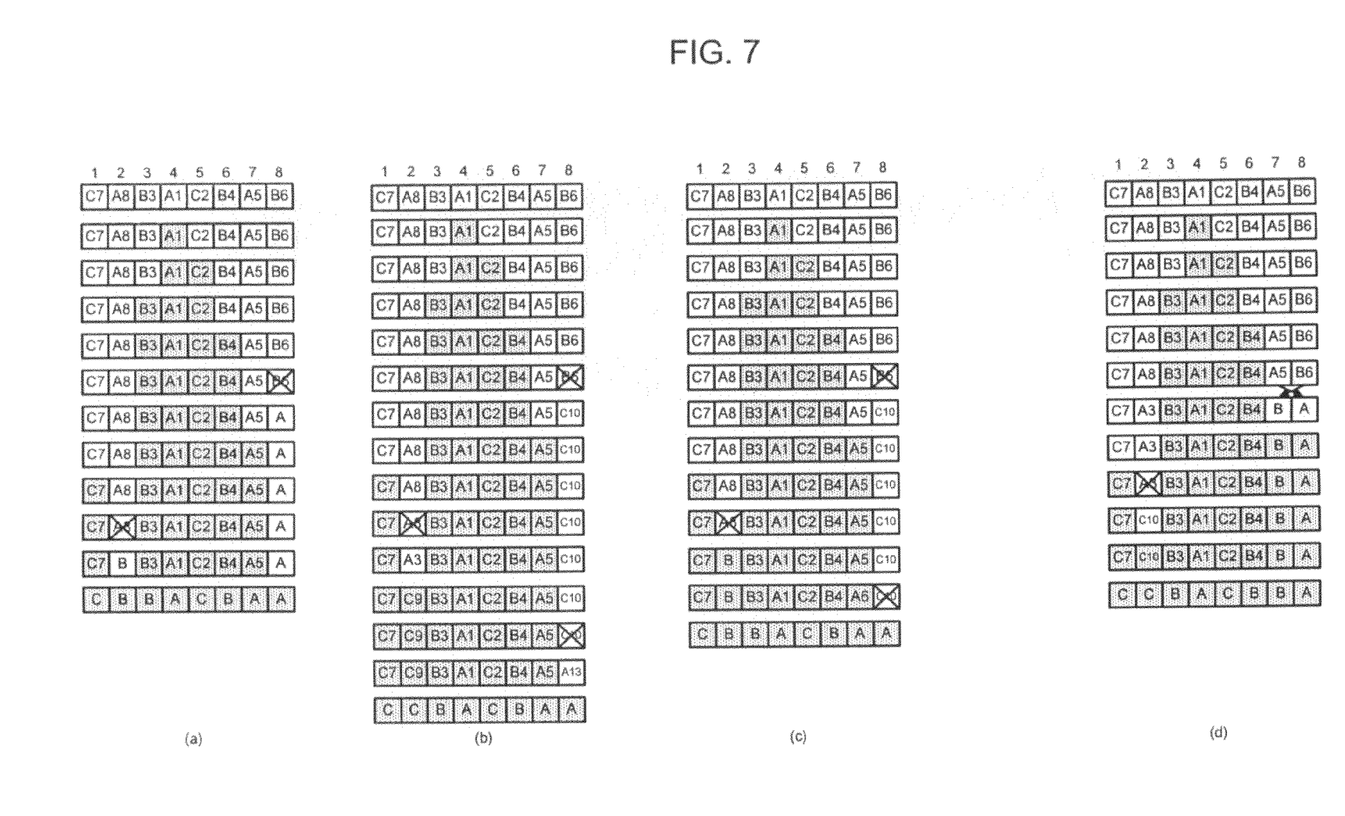
FIG. 7 is a diagram explaining the updating process in the first embodiment.

FIG. 7(*a*) corresponds to the item (1) described in the updating process of the first embodiment.

Each resource block sets as an allocation candidate a mobile station UE of the highest CQI based on the ranking results.

Referring to FIG. 7(*a*), the mobile station UE A becomes a candidate to which the resource blocks RB 2, 4 and 7 are allocated. The mobile station UE B becomes a candidate to which the resource blocks RB 3, 6 and 8 are allocated. The mobile station UE C becomes a candidate to which the resource blocks RB 1 and 5 are allocated. In FIG. 7, the number attached behind the UE number in each resource block shows its CQI rank.

In FIG. 7(*a*), RB 4 having the highest CQI is first allocated to the mobile station UE A.

Next, RB 5 having the second CQI is allocated to the mobile station UE C. RB 3 having the third CQI and RB 6 having the fourth CQI are allocated temporarily in turn to the mobile station UE B. At this time, one frequency resource block is temporarily allocated to the mobile stations UE A and UE C. Two frequency blocks are temporarily allocated to the mobile station UE B.

Next, when UE B is allocated on trial temporarily to RB 8 having the fifth CQI, three frequency blocks (RB 3, 6 and 8) are allocated to the mobile station UE B. As a result, the number of frequency blocks exceeds the maximum number of frequency blocks of "2". Therefore, setting is tried to allocate temporarily to RB 8 the mobile station UE A to be allocated to the resource block RB 7 adjacent to RB 8.

Successively, RB 7 having the sixth CQI is allocated to the mobile station UE A and RB 1 having the seventh CQI is allocated to the mobile station UE C.

Next, when it is tried that UE A is temporarily allocated to RB 2, which has the eighth CQI, three frequency blocks (RB 2, 4 and 7) are allocated to the mobile station UE A. As a result, the number of frequency blocks exceeds a maximum value of 2. Therefore, setting is made so as to allocate to RB 2 the mobile station allocated to RB having good CQI in the resource block adjacent to RB 2. In such a case, the mobile station UE B allocated RB 3 is allocated.

Finally, UE A, which is set so as to allocate temporarily, is allocated to RB 8, not yet allocated, and thus the process terminates.

FIG. 7(*b*) corresponds to the item (2) described in the updating process of the first embodiment.

Based on the ranking results, each resource block sets the mobile station UE having the highest CQI as an allocation candidate.

Referring to FIG. 7(*b*), the mobile station UE A becomes a candidate to which resource blocks RB 2, 4 and 7 are allocated. The mobile station UE B becomes a candidate to which resource blocks RB 3, 6 and 8 are allocated. The mobile station UE C becomes a candidate to which resource blocks RB 1 and 5 are allocated.

In FIG. 7(*b*), RB 4 having the highest CQI is first allocated to the mobile station UE A.

Next, RB 5 having the second CQI is allocated to the mobile station UE C. RB 3 having the third CQI and RB 6 having the fourth CQI are allocated in turn temporarily to the mobile station UE B. At this time, one frequency resource block is allocated temporarily to the mobile stations UE A and UE C. Two frequency blocks are allocated temporarily to the mobile station UE B.

Next, when it is tried that UE B is temporarily allocated to RB 8 having the fifth CQI, three frequency blocks (RB 3, 6 and 8) are allocated to the mobile station UE B. As a result, since the number of frequency blocks exceeds a maximum number of 2, setting is made to allocate UE C, having the second best CQI to the UE A, temporarily to RB 8.

Successively, RB 7 having the sixth CQI is allocated to the mobile station UE A and RB 1 having the seventh CQI is allocated to the mobile station UE C.

Next, when it is tried that UE A is allocated temporarily to RB 2 having the eighth CQI, three frequency block (RB 2, 4 and 7) are allocated to the mobile station UE A. As a result, the number of frequency blocks exceeds a maximum number of 2. Therefore, setting is made to allocate temporarily UE C, having the second best CQI to UE A, to RB 2. In such a case, the mobile station UE C is temporarily allocated.

Successively, RB 2 having the ninth CQI is allocated to the mobile station UE C.

When it is tried that RB 8 having the tenth CQI is allocated to the mobile station UE C, three frequency blocks (RB 1, 5 and 8) are allocated to the mobile station UE C. As a result, the number of frequency blocks exceeds a maximum value of 2. Therefore, UE A having the second best CQI to the UE C is allocated to RB 8.

FIG. 7(*c*) corresponds to the item (3) described in the updating process of the first embodiment.

Based on the ranking results, each resource block sets the mobile station UE having the highest CQI, as a candidate.

Referring to FIG. 7(*c*), the mobile station UE A becomes a candidate to which the resource blocks RB 2, 4 and 7 are allocated. The mobile station UE B becomes a candidate to which the resource blocks RB 3, 6 and 8 are allocated. The mobile station UE C becomes a candidate to which the resource blocks RB 1 and 5 are allocated. Referring FIG. 7(*c*), the number attached behind each UE number within each resource block shows the rank of CQI thereof.

In FIG. 7(*c*), RB 4 having the highest CQI is first allocated to the mobile station UE A.

Next, RB 5 having the second CQI is allocated to the mobile station UE C. RB 3 having the third CQI and RB 6 having the fourth CQI are temporarily allocated in turn to the mobile station UE B. At this time, one frequency resource block is allocated temporarily to the mobile stations UE A and UE C. Two frequency blocks are allocated temporarily to the mobile station UE B.

Next, when it is tried that UE B is temporarily allocated to RB 8 having the fifth CQI, three frequency blocks (RB 3, 6 and 8) are allocated to the mobile station UE B. As a result, the number of frequency blocks exceeds a maximum value of 2. Therefore, it is confirmed whether or not the resource block RB 7, adjacent to RB 8, is already in an allocated state. In this case, since the resource block RB 7 is not in an allocation state, setting is made to allocate the mobile station UE C, having the second best CQI to UE B, temporarily to RB 8.

In succession, RB 7 having the sixth CQI is allocated to the mobile station UE A and RB 1 having the seventh CQI is allocated to the mobile station UE C.

Next, when it is tried that UE A is allocated temporarily to RB 2 having the eighth CQI, three frequency blocks (RB 2, 4 and 7) are allocated to the mobile station UE A. As a result, the number of frequency blocks exceeds a maximum frequency block value of 2. Therefore, it is confirmed whether or not the resource block, adjacent to RB 2, is already in an allocate state. In this case, since the adjacent resource blocks on both sides are in an allocated state, the mobile station UE B, allocated to RB 3 having good CQI, is allocated.

Finally, to allocate the UE C set temporarily earlier to RB 8, not yet allocated, three frequency blocks (RB 1, 5 and 8) are allocated to the mobile station UE C. As a result, the number of frequency blocks exceeds a maximum frequency block value of 2. Therefore, it is confirmed whether or not resource blocks adjacent to RB 8 are already in allocated state. In this case, the mobile station UE A allocated to RB 7 is allocated.

FIG. 7(*d*) corresponds to the item (4) described in the updating process of the first embodiment.

Each resource block allocates the mobile station UE having the highest CQI as a candidate, base on the ranking results.

In FIG. 7 (*d*), the mobile station UE A becomes a candidate to which the resource blocks RB 2, 4 and 7 are allocated. The mobile station UE B becomes a candidate to which the resource blocks RB 3, 6 and 8 are allocated. The mobile station UE C becomes a candidate to which the resource blocks RB 1 and 5 are allocated. In FIG. 7, the number attached behind the UE number within each resource block shows the rank of CQI thereof.

In FIG. 7(a), RB 4 having the highest CQI is first allocated to the mobile station UE A.

Next, RB 5 having the second CQI is allocated to the mobile station UE C. RB 3 having the third CQI and RB 6 having the fourth CQI are allocated in turn temporarily to the mobile station UE B. At this time, one frequency resource block is allocated temporarily to the mobile stations UE A and UE C. Two frequency blocks are allocated temporarily to the mobile station UE B.

Next, when it is tried that UE B is allocated temporarily to RB 8 having the fifth CQI, three frequency blocks (RB 3, 6, and 8) are allocated to the mobile station UE B. As a result, the number of frequency blocks exceeds a maximum frequency block value of 2. Therefore, it is confirmed whether or not an adjacent resource block, having a lower CQI, exists. In this example, RB is lower than RB 8. Next, whether or not a frequency resource block can be generated is confirmed when the mobile station UE A, to be allocated to the resource block RB 7 adjacent to RB 8, is exchanged for allocation. In this case, since the frequency resource block can be generated, UE A is allocated to RB 8 and UE B is allocated to RB 7.

Next, when UE A is allocated temporarily to RB 2 having the eighth CQI, three frequency blocks (RB 2, 4 and 7) are allocated to the mobile station UE A. As a result, the number of frequency blocks exceeds a maximum value of 2. Therefore, it is confirmed whether or not an adjacent resource block having a lower CQI exists. Here, no adjacent resource blocks having CQI lower than RB 2 exist. Therefore, the mobile station UE C having the second best CQI to the UE A is allocated to RB 2.

Figure 8:
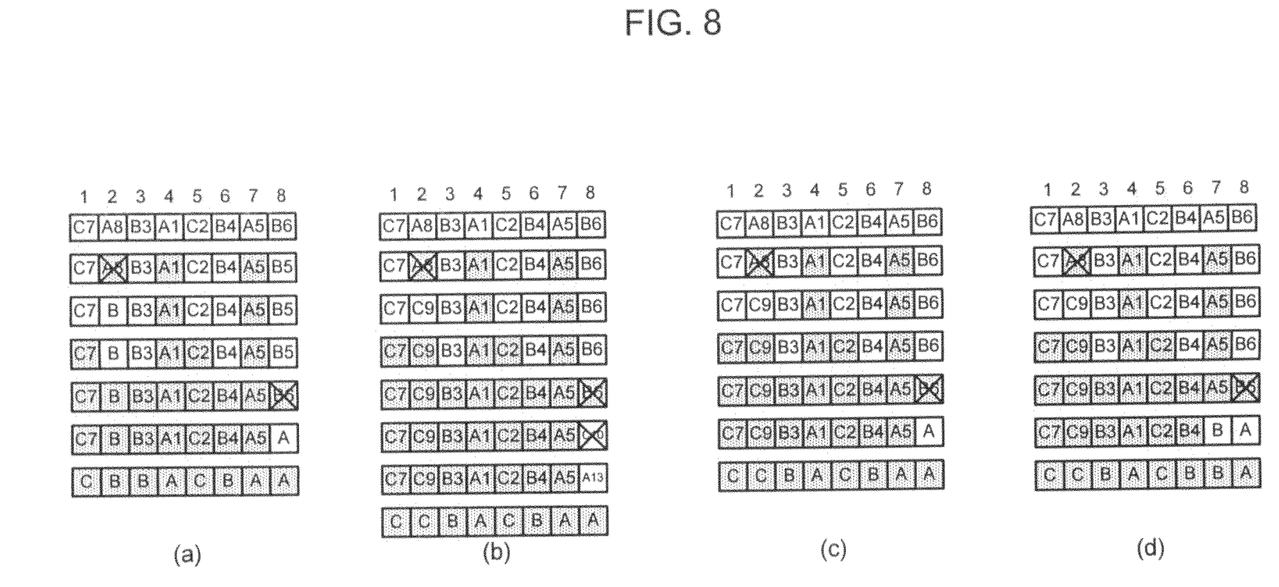
FIG. 8 is a diagram explaining the updating process in the second embodiment.

In succession, the updating process in the second embodiment will be explained by referring to FIG. 8.

In the present example, explanation will be made as to the case where eight resource blocks are allocated to the three mobile stations UE (UE A, UE B and UE C) and where the maximum number of frequency blocks is set to 2.

The present example uses the table, shown in FIG. 9, including CQIs of respective mobile stations ranked for each resource block.

FIG. 8(a) corresponds to the item (1) described in the updating process of the second embodiment.

Based on the ranking results, a resource block allocation is set to a mobile station having a highest CQI in each resource block.

Referring to FIG. 7(a), the mobile station UE A becomes a candidate to which the resource blocks RB 2, 4 and 7 are allocated. The mobile station UE B becomes a candidate to which the resource blocks RB 3, 6 and 8 are allocated. The mobile station UE C becomes a candidate to which the resource blocks RB 1 and 5 are allocated.

Referring to FIG. 7(a), allocation is carried out from the mobile station UE A having a highest CQI. Three frequency blocks (RB 2, 4 and 7) are allocated to the mobile station UE A. As a result, the number of frequency blocks exceeds a maximum number of 2. Therefore, a resource block adjacent to RB 2 having the lowest CQI among the frequency blocks is confirmed. In this case, RB 1 and RB 3 are confirmed and the mobile station UE B to be allocated to RB 3 having a higher CQI is set for tentative allocation.

Next, a resource block is allocated to the mobile station UE C having the second CQI. The mobile station UE C becomes a candidate to which the resource blocks RB 1 and 5 are allocated. Since the number of frequency blocks does not exceed a maximum number of 2, the allocation is implemented without any change.

Next, a resource block is allocated to the mobile station UE B having the third CQI. The mobile station UE B becomes a candidate to which the resource blocks RB 2, 3, 6 and 8 are allocated. As a result, the number of frequency blocks exceeds a maximum number of 2. Among them, a resource block adjacent to RB 8 having a lowest CQI is confirmed. In this case, RB 7 is confirmed and the mobile station UE A allocated to RB 7 is allocated.

FIG. 8(b) corresponds to the item (2) described in the updating process of the second embodiment.

Based on the ranking results, a resource block allocation is set to a mobile station having a highest CQI in each resource block.

Referring to FIG. 8(b), the mobile station UE A becomes a candidate to which resource blocks RB 2, 4 and 7 are allocated. The mobile station UE B becomes a candidate to which resource blocks RB 3, 6 and 8 are allocated. The mobile station UE C becomes a candidate to which resource blocks RB 1 and 5 are allocated.

Referring to FIG. 8(b), allocation is first made from the mobile station UE A having a highest CQI. Three frequency blocks (RB 2, 4 and 7) are allocated to the mobile station UE A. As a result, the number of frequency blocks exceeds a maximum number of 2. Then, among them, a resource block adjacent to the RB 2 having a lowest CQI is confirmed. In this case, RB 1 and RB 3 are confirmed. Setting is made to allocate the mobile station UE B temporarily to RB 3 having a higher CQI.

Next, a resource block is allocated to the mobile station UE C having the second CQI. The mobile station UE C becomes a candidate to which the resource blocks RB 1 and 5 are allocated. Since the number of frequency blocks does not exceed a maximum number of 2, allocation is made without any change.

Next, a resource block is allocated to the mobile station UE B having the third CQI. The mobile station UE B becomes a candidate to which the resource blocks RB 2, 3, 6 and 8 are allocated. As a result, the number of frequency blocks exceeds a maximum number of 2. Then, setting is made to allocate temporarily UE C having the second best CQI to UE B, in RB 8 having the lowest CQI among them. However, since the number of frequency blocks exceeds a maximum number of 2, UE A having the second best CQI to UE C is allocated temporarily.

FIG. 8(c) corresponds to the item (3) described in the updating process of the second embodiment.

Based on the ranking results, a resource block allocation is set to the mobile station having a highest CQI in each resource block.

Referring to FIG. 8(c), the mobile station UE A becomes a candidate to which resource blocks RB 2, 4 and 7 are allocated. The mobile station UE B becomes a candidate to which resource blocks RB 3, 6 and 8 are allocated. The mobile station UE C becomes a candidate to which resource blocks RB 1 and 5 are allocated.

Referring FIG. 8(c), allocation is made from the mobile station UE A having the highest CQI. Three frequency blocks (RB 2, 4 and 7) are allocated to the mobile station UE A. At a result, the number of frequency blocks exceeds a maximum value of 2. Then, it is confirmed whether or not the resource block adjacent to RB 2 having a lowest CQI among them has been already allocated. In this case, both RB 1 and RB 3 are not in an allocated state. Therefore, setting is made to allocate temporarily UE C having the second best CQI to UE A in RB 2.

Next, a resource block is allocated to the mobile station UE C having the second CQI. The mobile station UE C becomes a candidate to which resource blocks 1, 2 and 5 are allocated. Since the number of frequency blocks does not exceed a maximum value of 2, allocation is made without any change.

Next, a resource block is allocated to the mobile station UE B having the third CQI. The mobile station UE B becomes a candidate to which resource blocks RB 3, 6 and 8 are allocated. As a result, the number of frequency blocks exceeds a maximum value of 2. Then, whether or not the resource block adjacent to RB 8 having the lowest CQI among them is in an allocated state is confirmed. In this case, since the mobile station UE A is in an allocated state to RB 7, the UE A is allocated.

FIG. 8(d) corresponds to item (4) described in the updating process of the second embodiment.

Based on the ranking results, setting is made to allocate a resource block to a mobile station having a highest CQI.

Referring to FIG. 8(d), the mobile station UE A becomes a candidate to which resource blocks RB 2, 4 and 7 are allocated. The mobile station UE B becomes a candidate to which resource blocks RB 3, 6 and 8 are allocated. The mobile station UE C becomes a candidate to which resource blocks RB 1 and 5 are allocated.

Referring to FIG. 8(d), allocation is made from the mobile station UE A having the highest CQI. Three frequency blocks (RB 2, 4 and 7) are allocated to the mobile station UE A. As a result, the number of frequency blocks exceeds a maximum value of 2. Then, in a resource block adjacent to RB 2 having the lowest CQI among them, whether or not CQI is lower than the self RB is confirmed. In this case, since CQIs on the both sides are not low, it is set that the mobile station UE C having the second best CQI to the mobile station UE A is allocated temporarily in RB 2.

Next, a resource block is allocated to the mobile station UE C having the second CQI. The mobile station UE C becomes a candidate to which resource blocks RB 1 and 5 are allocated. Since the number of frequency blocks does not exceed a maximum value of 2, allocation is performed without any change.

Next, a resource block is allocated to the mobile station UE B having the third CQI. The mobile station UE B becomes a candidate to which resource blocks RB 2, 3, 6 and 8 are allocated. As a result, the number of frequency blocks exceeds a maximum value of 2. Then, among them, it is confirmed whether or not a resource block adjacent to RB 2 having the lowest CQI has CQI lower than self RB. In this case, since RB 7 is lower, whether or not the frequency resource block can be generated is confirmed by exchanging the mobile station UE B for the mobile station UE A to be allocated to the resource block RB 7 adjacent to RB 8 and by allocating the mobile station UE A. In this case, since the frequency resource block can be generated, UE A is allocated to RB 8 and UE B is allocated to RB 7.

As clear from the above explanation, the base station and mobile stations according to the present invention may be composed of hardware but may be realized with computer programs.

In that case, the processor that runs with programs stored in a program memory can realize functions and operations similar to those in the embodiments described above. Partial functions of the embodiments described above may be realized using computer programs.

The present invention is applicable generally to mobile wireless systems that perform resource block allocation.

The present application claims the priority based on Japanese patent application No. 2008-072616 filed on Mar. 19, 2008, of which all disclosures are included.

The invention claimed is:

1. A wireless communication system, comprising:
a ranking unit for ranking a mobile station for each resource block, based on a channel condition; and
an allocator for allocating an uplink resource block to said mobile station based on the ranking of said mobile station in such a way that a number of resource block groups, in which more than one uplink resource blocks are serially arranged on a frequency axis, per mobile station is set to less than a set value,
wherein the number of the resource block groups per said mobile station is limited,
wherein said allocator decides an uplink resource block to be allocated to a mobile station for each uplink resource block according to the ranking of said mobile station, and
wherein in the allocating the uplink resource block to said mobile station, when the number of resource block groups already allocated to the mobile station exceeds said set value, said allocator generates a resource block group, including the uplink resource block and adjacent uplink resource blocks.

2. A wireless communication system, comprising:
a ranking unit for ranking a mobile station for each resource block, based on a channel condition; and
an allocator for allocating an uplink resource block to said mobile station based on the ranking of said mobile station in such a way that a number of resource block groups, in which more than one uplink resource blocks are serially arranged on a frequency axis, per mobile station is set to less than a set value,
wherein the number of the resource block groups per said mobile station is limited,
wherein said allocator decides an uplink resource block to be allocated to a mobile station for each uplink resource block according to the ranking of said mobile station, and
wherein in the allocating the uplink resource block to said mobile station, when the number of resource block groups already allocated to said mobile station exceeds said set value, said allocator allocates the uplink resource block to a mobile station to which an adjacent resource block is allocated or has been allocated, to generate a resource block group.

3. A wireless communication system, comprising:
a ranking unit for ranking a mobile station for each resource block, based on a channel condition; and
an allocator for allocating an uplink resource block to said mobile station based on the ranking of said mobile station in such a way that a number of resource block groups, in which more than one uplink resource blocks are serially arranged on a frequency axis, per mobile station is set to less than a set value,
wherein the number of the resource block groups per said mobile station is limited,
wherein said allocator decides an u link resource block to be allocated to a mobile station for each uplink resource block according to the ranking of said mobile station, and
wherein, in the allocating the uplink resource block to said mobile station, when the number of resource block groups already allocated to said mobile station exceeds said set value, said allocator allocates an uplink resource block to a lower order mobile station to generate a resource block group.

4. A base station, comprising:
a ranking unit for ranking mobile stations for each uplink resource block, based on a channel state; and
an allocator for allocating an uplink resource block to a mobile station based on said mobile station ranking in a such a way that a number of resource block groups, including more than one uplink resource blocks continuously formed on a frequency axis, to a single mobile station is set to less than a set value,
wherein the number of the resource block groups of said single mobile station is limited,
wherein said allocator decides an uplink resource block to be allocated to a mobile station for each uplink resource block according to said mobile station ranking, and
wherein, in the allocating the uplink resource block to said mobile station, when the number of resource block groups already allocated to the mobile station exceeds said set value, said allocator generates a resource block group, including the uplink resource block and adjacent uplink resource blocks.

5. A base station, comprising:
a ranking unit for ranking mobile stations for each uplink resource block, based on a channel state; and
an allocator for allocating an uplink resource block to a mobile station based on said mobile station ranking in a such a way that a number of resource block groups, including more than one uplink resource blocks continuously formed on a frequency axis, to a single mobile station is set to less than a set value,
wherein the number of the resource block groups of said single mobile station is limited,
wherein said allocator decides an uplink resource block to be allocated to a mobile station for each uplink resource block according to said mobile station ranking, and
wherein, in the allocating the uplink resource block to said mobile station, when the number of resource block groups to which has already allocated to the mobile station exceeds said set value, said allocator allocates the uplink resource block to a mobile station to which an adjacent uplink resource block is allocated or has been already allocated, to generate a resource block group.

6. A base station, comprising:
a ranking unit for ranking mobile stations for each uplink resource block, based on a channel state; and
an allocator for allocating an uplink resource block to a mobile station based on said mobile station ranking in a such a way that a number of resource block groups, including more than one uplink resource blocks continuously formed on a frequency axis, to a single mobile station is set to less than a set value,
wherein the number of the resource block groups of said single mobile station is limited,
wherein said allocator decides an uplink resource block to be allocated to a mobile station for each uplink resource block according to said mobile station ranking, and
wherein in the allocating the uplink resource block to said mobile station, when the number of resource block groups already allocated to the mobile station exceeds said set value, said allocator allocates a resource block to a lower order mobile station of said mobile stations, to generate a resource block group.

7. A resource block allocation method, comprising:
allocating an uplink resource block to a mobile station based on information ranking mobile stations for each uplink resource block according to a channel state in such a way that a number of resource block groups, including more than one uplink resource blocks continuously formed on a frequency axis, to a single mobile station is less than a set value, wherein the number of the resource block groups of said single mobile station is limited;
deciding a resource block to be allocated to a mobile station for each uplink resource block according information ranking said mobile station; and
in the allocating the uplink resource block to said mobile station, generating a resource block group, including the uplink resource block and adjacent uplink resource blocks, when the number of resource block groups already allocated to the mobile station exceeds said set value.

8. A resource block allocation method comprising
allocating an uplink resource block to a mobile station based on information ranking mobile stations for each uplink resource block according to a channel state in such a way that a number of resource block groups, including more than one uplink resource blocks continuously formed on a frequency axis, to a single mobile station is less than a set value, wherein the number of the resource block groups of said single mobile station is limited;
deciding a resource block to be allocated to a mobile station for each uplink resource block according information ranking said mobile station; and
in the allocating the uplink resource block to said mobile station, when the number of resource block groups already allocated to the mobile station exceeds said set value, generating a resource block group by allocating the resource block to a mobile station to which an adjacent resource block is allocated or has been allocated.

9. A resource block allocation method, comprising:
allocating an uplink resource block to a mobile station based on information ranking mobile stations for each uplink resource block according to a channel state in such a way that a number of resource block groups, including more than one uplink resource blocks continuously formed on a frequency axis, to a single mobile station is less than a set value wherein the number of the resource block groups of said single mobile station is limited;
deciding a resource block to be allocated to a mobile station for each uplink resource block according information ranking said mobile station; and
in the allocating the uplink resource block to said mobile station, when the number of resource block groups already allocated to the mobile station exceeds said set value, generating a resource block group by allocating an uplink resource block to a lower order mobile station of said mobile stations.

* * * * *